US008631437B2

(12) United States Patent
Schwesinger et al.

(10) Patent No.: US 8,631,437 B2
(45) Date of Patent: Jan. 14, 2014

(54) AUTOMATICALLY GENERATED TV FAVORITES LIST

(75) Inventors: Mark D. Schwesinger, Seattle, WA (US); Jeffrey Fong, Seattle, WA (US); Joseph A Schrader, Woodenville, WA (US); Mark G. Young, Redmond, WA (US); Todd San Jule, Woodenville, WA (US)

(73) Assignee: Microsoft Corporation, Redmond, WA (US)

( * ) Notice: Subject to any disclaimer, the term of this patent is extended or adjusted under 35 U.S.C. 154(b) by 62 days.

(21) Appl. No.: 13/433,814

(22) Filed: Mar. 29, 2012

(65) Prior Publication Data

US 2012/0192218 A1 Jul. 26, 2012

Related U.S. Application Data

(63) Continuation of application No. 11/283,153, filed on Nov. 18, 2005, now Pat. No. 8,171,515.

(51) Int. Cl.
*H04N 7/16* (2011.01)
*H04N 5/445* (2011.01)

(52) U.S. Cl.
USPC ............... 725/46; 725/13; 725/14; 725/47

(58) Field of Classification Search
USPC .......................... 725/13–14, 46–47
See application file for complete search history.

(56) References Cited

U.S. PATENT DOCUMENTS

| 6,609,253 B1* | 8/2003 | Swix et al. ...................... 725/88 |
| 7,284,256 B2* | 10/2007 | Candelore et al. .............. 725/46 |
| 2006/0143664 A1* | 6/2006 | Hartselle et al. ................ 725/88 |
| 2007/0118848 A1* | 5/2007 | Schwesinger et al. ............ 725/9 |
| 2007/0174862 A1* | 7/2007 | Kushida et al. ................. 725/15 |

* cited by examiner

*Primary Examiner* — Jason J Chung
*Assistant Examiner* — Sumaiya A Chowdhury
(74) *Attorney, Agent, or Firm* — Microsoft Corporation

(57) ABSTRACT

A favorite channel list for a media system is generated by observing the viewing, surfing, and recording habits of a user. The viewing habits may include the duration and frequency of viewing a channel. A user's surfing habits, including navigation habits of a guide, the method used for navigation to a channel, and information queries made during a surfing session may be used to determine which channels may be added to a favorites list. When the user has an ability to record a program and view the program later, the user's behavior in selecting programs for recording, and the behaviors of playing back and archiving recorded shows may also be used to identify favorite channels. In some embodiments, the favorites list may be customized for a user or node of a playback system, as well as time of day.

17 Claims, 4 Drawing Sheets

AUTOMATICALLY GENERATED TV FAVORITES LIST

CROSS REFERENCE TO RELATED APPLICATIONS

This application is a continuation application of U.S. patent application Ser. No. 11/283,153 entitled "Automatically Generated TV Favorites List" filed Nov. 18, 2005 by Mark D. Schwesinger, et al., the entire contents of which are hereby incorporated by reference for all they disclose and teach.

BACKGROUND a. Technical Field

The present invention pertains generally to controlling audio visual equipment and specifically to adapting a user interface to a user's behavior.

b. Description of the Background

Television and other media are often offered via cable television, terrestrial broadcast, and satellite broadcast systems and bombard a user with literally several hundred channel choices. Users tend to have limited viewing habits and use a small subset of the available channels on a day to day basis.

Some media systems have favorite channels lists that a user may enter a set of channels for quick viewing. These lists require a user to take the time to identify channels of interest and somehow select the channels for the list. Many users do not take advantage of these features for a number of reasons, not the least of which is that the entire process can be cumbersome and confusing to the average user.

SUMMARY

A favorite channel list for a media system is generated by observing the viewing, surfing, and recording habits of a user. The viewing habits may include the duration and frequency of viewing a channel. A user's surfing habits, including navigation habits of a guide, the method used for navigation to a channel, and information queries made during a surfing session may be used to determine which channels may be added to a favorites list. When the user has an ability to record a program and view the program later, the user's behavior in selecting programs for recording, and the behaviors of playing back and archiving recorded shows may also be used to identify favorite channels. In some embodiments, the favorites list may be customized for a user or node of a playback system, as well as time of day.

DETAILED DESCRIPTION

Figure 1:
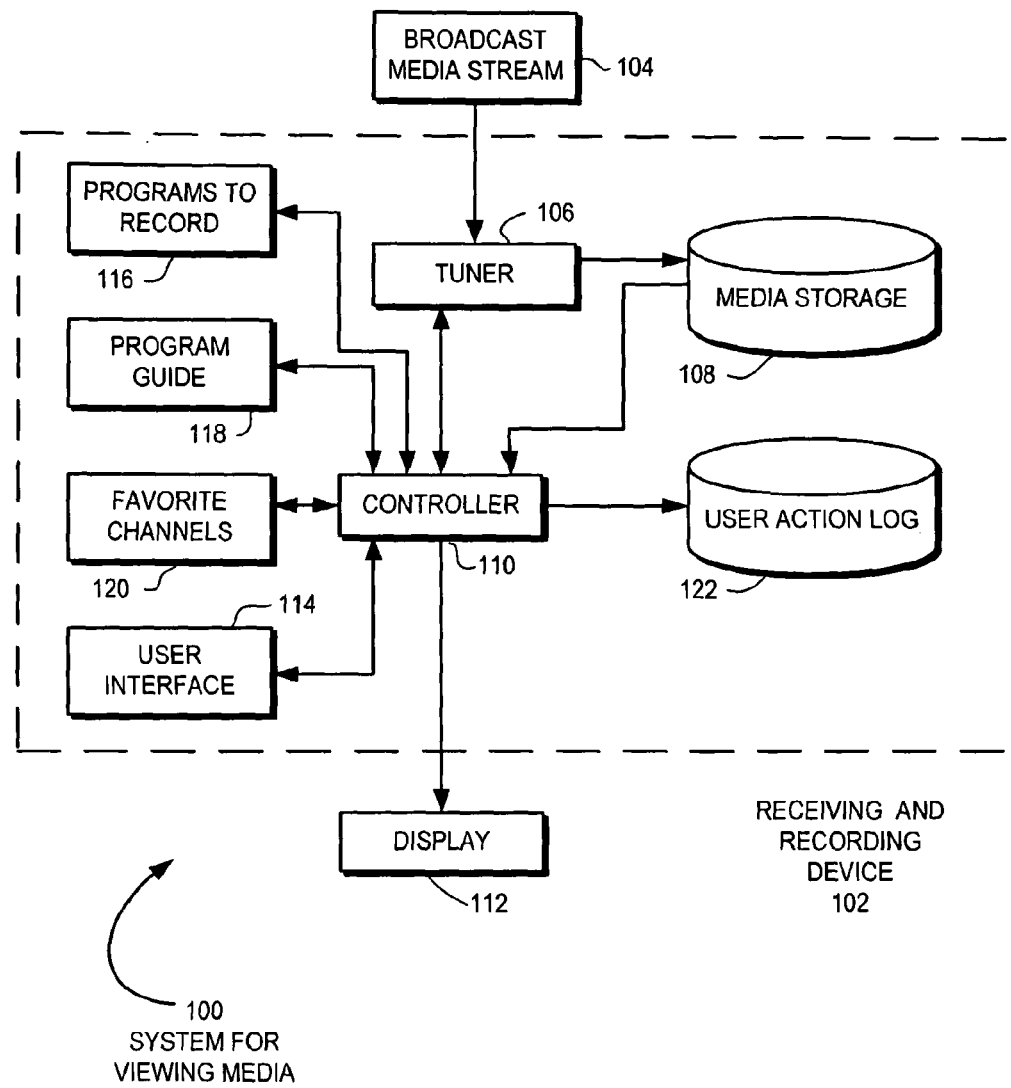
FIG. 1 is a diagrammatic illustration of an embodiment showing a system for viewing media.

While the invention is susceptible to various modifications and alternative forms, specific embodiments of the invention are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a pictorial representation of an embodiment 100 showing a system for viewing media. A receiving and recording device 102 receives a broadcast media stream 104. The broadcast stream 104 is fed into a tuner 106, which stores various media content in a media storage 108. A controller 110 commands the tuner 106 and controls various aspects of the receiving and recording device 102. Content that is stored in the media storage 108 may be viewed on the display 112. The display 112 may be used in conjunction with a user interface 114 to give commands to and receive information from the controller 110.

The controller 110 may use a list of programs to record 116 to direct the tuner 106 to select programs and store the programs in the media storage 108 for later viewing. A program guide 118 may be used to determine which programs will be shown over the broadcast media stream 104. A favorite channels list 120 may be created by user input as well as by monitoring user actions with the device 102.

The controller 110 may monitor the actions of a user and store the actions in a user action log 122. Various actions may be used to generate a favorite channels list 120, including the user's behavior in setting up programs to record 116, how the user views and stores the recorded programs in the media storage 108, the user's behavior when searching the program guide 118, as well as the user's behavior when viewing live programming.

The embodiment 100 may be a digital video recorder or home media system that receives input from a broadcast stream 104. The broadcast stream 104 may be any type of broadcast media, including cable television, terrestrial broadcast, satellite broadcast, internet broadcast, or other broadcast media. In many cases, the broadcast stream 104 may be a video stream that has accompanying audio. In other cases, the broadcast stream 104 may be a pure audio media stream such as a radio station or other similar format. For the purposes of this specification, references to 'viewing' content shall also include listening to audio content for which no video image is available, or viewing images for which no audio is available. The display 112 may be a video monitor, such as a television, computer display, or other video display with or without speakers or other audio monitors. In embodiments where the broadcast media stream 104 is audio only, the display 112 may be speakers, headphones, or other audio reproduction device.

The tuner 106 may tune into a channel being broadcast and select the channel for live viewing directly on the display 112 or to be stored in the media storage. In the case of live viewing, the content may be transferred through the media storage 108 or may bypass the media storage 108. In some embodiments, live content may be routed through the media storage 108 so that certain features, such as instant replay, pause, or other functions may be executed.

In many cases, the broadcast media stream 104 may contain hundreds if not thousands of possible choices for a user, a vast majority of which may never be viewed by the user.

During the course of use of the device 102, the user may seek out certain programs, view certain programs, and repeatedly browse certain channels. These habits may indicate that certain channels are preferred and thus should be included in the favorite channel list 120. When a user browses available programming using the program guide 118, the user may preferentially browse channels listed in the favorite channels list 120. The favorite channels list 120 may be used to browse live programming. Additionally, the favorite channels list 120 may be used to highlight certain channels in the program guide 118 or may be used to sort the program guide 118 such that only the favorite channels are displayed. The favorite channels list 120 may be used for other purposes including prioritizing programs that are recorded or any other purpose.

As a user operates the device 102, each action taken may be used to determine which channels are preferred. For example when a user browses the program guide 118, preferred channels may be those where the user lingers or views detailed information about an upcoming show. Additionally, a preferred channel may be sensed when the user enters a channel number directly rather than scrolling through a list. A user may linger on a channel for a few seconds, scroll across to see titles of upcoming programs, or perform some detailed viewing of a particular channel. Such actions may indicate that the channel is a preferred channel. However, if the user is viewing information about a channel for an extended period of time, it may indicate that the user has stepped away from the display 112 and is distracted or no longer present. Such actions may not indicate a preference for that particular channel.

Many user actions may indicate a preference if performed for a minimum period of time, but may not indicate a preference when performed for an extended period of time. For example, if a certain channel were selected for live viewing but left on for several hours, the user may have fallen asleep or otherwise be indisposed.

Each user action may indicate varying degrees of importance in determining whether the channel is a favorite. For example, the browsing of detailed information in a program guide may be less important than when a user specifically selects a channel by direct entry of the channel number and interactively views a program while using several interactive features such as rewind, pause, or other features. Thus, various types of actions may be weighted differently when determining a list of favorite channels.

Similarly, each action within a type of action may be weighted differently. For example, channels viewed for at least a minimum amount of time may be potential favorite channels. Those channels viewed for a few minutes may be less preferred than those viewed for an hour or more.

Various user actions may be stored in the user action log. The actions may be stored in any useful manner, including keeping detailed entries for individual actions, maintaining summary statistics, or any other useful manner. In some embodiments, the favorite channels list 120 may be recalculated at each instance the favorite channels list 120 is used by the controller 110. In other embodiments, the favorite channels list 120 may be updated on a periodic basis, such as every day or week. In still other embodiments, the favorite channels list 120 may be generated when a user explicitly requests.

A user may manually add or remove channels from the favorite channels list 120. In some embodiments, a user may create an initial favorite channels list 120 through manually selecting channels and the favorite channels list 120 may be updated as the user operates the device 102.

In some embodiments, a separate favorite channels list 120 may be created for different users. When operating the device 102, a specific user may be identified by the input device used, by indicating the user's identity at the beginning of a session, or by any other mechanism.

The favorite channels list 120 may change depending on the time of day or day of week. For example, a user may have certain preferences during morning that are different in the evening or late at night. Programming and channels that are viewed on weekends may not be the preferred programming during the week. In some embodiments, the time of day may be a factor used when tracking a user's actions and when subsequently generating a favorite channel list 120.

Some embodiments of the device 102 may have several tuners and multiple input streams. For example, some devices may have two tuners 106 so that one channel may be viewed live while another channel is being recorded. Another device 102 may have a tuner that is adapted to receive cable television media streams and another tuner that receives terrestrial broadcast television or radio.

Figure 2:
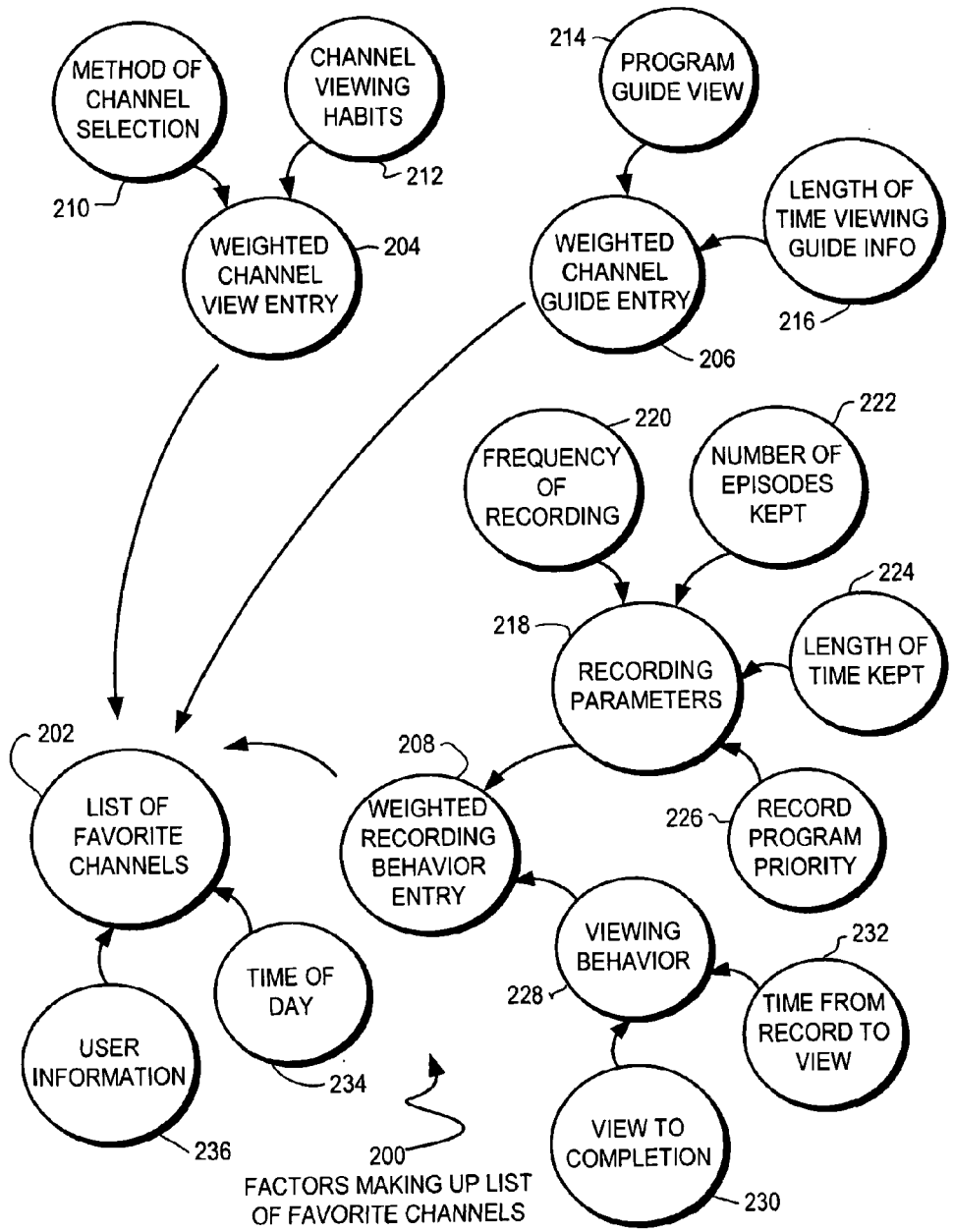
FIG. 2 is a diagrammatic illustration of an embodiment showing factors making up a list of favorite channels.

FIG. 2 is a diagrammatic illustration of an embodiment 200 showing various factors that make up a list of favorite channels. The list of favorite channels 202 may be made up of weighted channel view entries 204, weighted channel guide entries 206, and weighted recording behavior 208.

In some embodiments, a favorite channels list may be generated by ranking channels based on the aggregation of several different interactions with each channel. Some embodiments may create positive values for each action that are then summed for each channel. Channels may then be ranked based on the values assigned to the actions that relate to that channel. In some embodiments, some actions may positively influence the channel ranking while other actions may negatively influence the channel ranking.

Different embodiments may have different methods of valuing various user actions to calculate a favorite channels list. In some embodiments, integer counts may be tallied for each channel while in other embodiments, real number values may be assigned to each action. In many cases, an interaction may be weighted by multiplying several values together to determine a weighted value for an action.

Some embodiments may apply a higher weighting to recent actions and lower weighting to older actions. Such an embodiment may adapt to changes in a user's behavior over time. Various methods may be used to calculate different impact for a recent action over a past action.

The weighted channel entries 204 may take into account the method of channel selection 210 and various channel viewing habits 212. When a user changes to a channel by scrolling up or down through live programming or while using a program guide, the channel selection may be weighted lower than when a user enters a channel number directly. In some embodiments, channel selection through a program guide may be weighted differently than channel selection made through browsing live content on a full screen.

The channel viewing habits 212 may change a channel's weighting depending on how a user views a particular channel. A factor may be the length of time that a user views a particular channel. One method for determining a weighting factor may involve multiplying a factor by the length of time that a user viewed a program. Thus, a short viewing session of a few seconds may be weighted much lower than a session of an hour. In some cases, a maximum time may be applied so that one channel does not receive an improperly high weighted value if a user falls asleep, leaves the room, or is otherwise indisposed.

A weighted channel guide entry 206 may be generated from a program guide view 214 and the length of time viewing guide information 216. Various methods used to view channel information using a program guide may be weighted differently. For example, direct entry of a channel name or number may be weighted higher than viewing channel information when scrolling up or down through a list. Further, scrolling through future programming offered on a channel may be weighted higher than merely pausing over a channel and viewing the current showing. When a user activates a detailed view of a program or a specific channel, that action may be weighted higher. The actual actions permitted by different embodiments may affect which actions are weighted higher than others. More difficult actions or those requiring more directed interaction to find certain information may be weighted higher. For example, if a user must press several buttons in succession to view information related to a specific channel, such action may be weighted higher.

The length of time spent viewing guide information 216 may be factored into the weighted channel guide entry 206. In some embodiments, the length of time of an interaction may be multiplied by a factor for the particular action to arrive at a weighted value. Longer interactions may thus be weighted higher than shorter ones. Like with channel viewing factors, very lengthy interactions may be discounted so that long interactions due to inattentiveness are not weighed too highly.

In some embodiments, ranges of length of time may be assigned a weighting factor which may be multiplied by a factor for a particular action, rather than by multiplying a time value. For example, an interaction of zero to one seconds may have a multiplier of zero, an interaction of one to 5 seconds may have a multiplier of 0.2, an interaction of 5 to 10 seconds may have a multiplier of 1.4, and an interaction of more than 10 seconds may have a multiplier of 0.6. Such an example may place a high value on interactions of 5 to 10 seconds, but discount longer or shorter interactions. Such ranges may be predetermined or may be changed or adapted based on the user's habits with the device.

A weighted recording behavior entry 208 may be determined from various recording parameters 218, the recorded program priority 226, and viewing behavior 228. Weighting factors associated with each different parameter may be multiplied together to calculate a weighted recording behavior entry 208. In some other embodiments, the combination of several parameters may have a predetermined weighting value. Various embodiments may have different methods for determining a weighted entry for recording behavior 208.

The recording parameters 218 may be determined from several factors, including frequency of recording 220, the number of episodes kept 222, the length of time the recordings are kept 224, and the recording program priority 226. Various parameters set or adjusted by the user with respect to the actions of recording and storing a program for later viewing are included in the recording parameters 218 to determine whether a particular channel is a preferred channel. Channels from which a user records often and views those recordings may be weighted higher than other channels.

In some cases, a user may select specific programs for recording, regardless of the channels on which the programs are broadcast. A program may be broadcast on several different channels. Thus, a user's selection of a single program for recording may result in weighting several channels higher.

Channels where a program is recorded with high frequency may be ranked or weighted higher. For example, a channel where a program is recorded no more than once a week may be weighted lower than a channel where all episodes of a program are recorded, even when multiple episodes are recorded in a day. Higher weighting may apply when the user selects a recording frequency parameter that enables more frequent recording, even if multiple episodes are not available. In some embodiments, the higher weighting may apply when the user selects a setting that is not a default setting. Such action of changing a default setting may indicate that the user values the channel higher than other channels. Conversely, the user may select a recording frequency that is less than a default setting. This may indicate that the channel is of less importance and a lower or even negative weight may be generated.

The number of episodes kept 222 for a particular program may indicate the user's preference for the particular content and thus the channels from which the program is recorded. A user may opt to keep many episodes of a program in the program storage, which indicates a preference for the programming and the channel or channels from which the programming comes. A large number of episodes kept may indicate a high preference while a low number of episodes may indicate a lower preference.

A user may elect to keep some or all of the episodes of a particular program for different periods of time, resulting in a length of time kept parameter 224. In many cases, a recording system may retrieve and store content until the storage mechanism is full, after which some programs may be discarded. A user may be able to set different parameters for storing programs. In some instances, the user may be able to require the system to store certain episodes permanently. Other instances may enable a user to prioritize some programs for longer storage than others. Those episodes that are stored longer may indicate a preference for the content and the channels from which the episodes come.

The recording program priority 226 may include prioritization selections that a user makes when two different programs are requested to be recorded simultaneously. Through various mechanisms, a user may be asked to resolve conflicts between several conflicting recording requests. In resolving the requests, the user may explicitly designate one program more desirable than another and thus implicitly prefer one channel over another. This implicit designation may be used to weight the preferred channel over another channel when generating a list of favorite programs.

The user's behavior in viewing recorded programs 228 may indicate strong preferences for specific channels. Often, users may select programs for recording that go unviewed because the user does not have the time to view an episode before the storage system deletes the episode to make room for newly recorded episodes. Episodes that are substantially viewed to completion 230 may be used to indicate a strong preference for the programming and channels from which the programs come. Episodes that are not viewed may indicate a small positive, a neutral, or a negative preference for a channel, depending on the embodiment. Partially viewed episodes may indicate a strong preference, but may not be as strong a preference as those episodes that are viewed substantially to completion. A user's consistency in recording and viewing specific programs may be a strong indicator of preference for a channel. In many embodiments, the user's viewing behavior of recorded programs 228 may be one of the strongest indicators of a user's preference for a channel.

Some embodiments may create weighted preferences for channels based on the elapsed time from recording to viewing 232. Those programs that are recorded and viewed very quickly may be preferred over those that linger in storage and are viewed after a substantial delay. In some embodiments, the delay may not be a negative indicator, as a user's viewing habits and schedule may merely make a later viewing schedule more convenient.

Some embodiments may capture the time of day 234 or day of week parameters for calculating a list of favorite channels 202. In some cases, the list of favorite channels 202 may be substantially different for early morning programming as opposed to evening or late night programming. The list of favorite channels 202 may vary from day to day. For example, a list of preferred channels for Saturday afternoon when an adult may enjoy a substantial amount of sports entertainment may be much different than weekday afternoons when a child may enjoy children's programming.

User information 236 may also be used to determine different lists of favorite channels 202. In the example above, when an adult operates the system to view sports programming, the adult's user identification or other indicator may be saved with the user's actions and likewise for the child. Thus when the child operates the system, children's programming may be preferred.

In some embodiments, the user information 236 may include a specific set of user preferences for various channels. For example, a child's user information may include a set of blocked channels that will not be displayed in a favorite channels list 202. Similarly, another user's information may include specific channels that are to be included regardless of their weighting.

Figure 3:
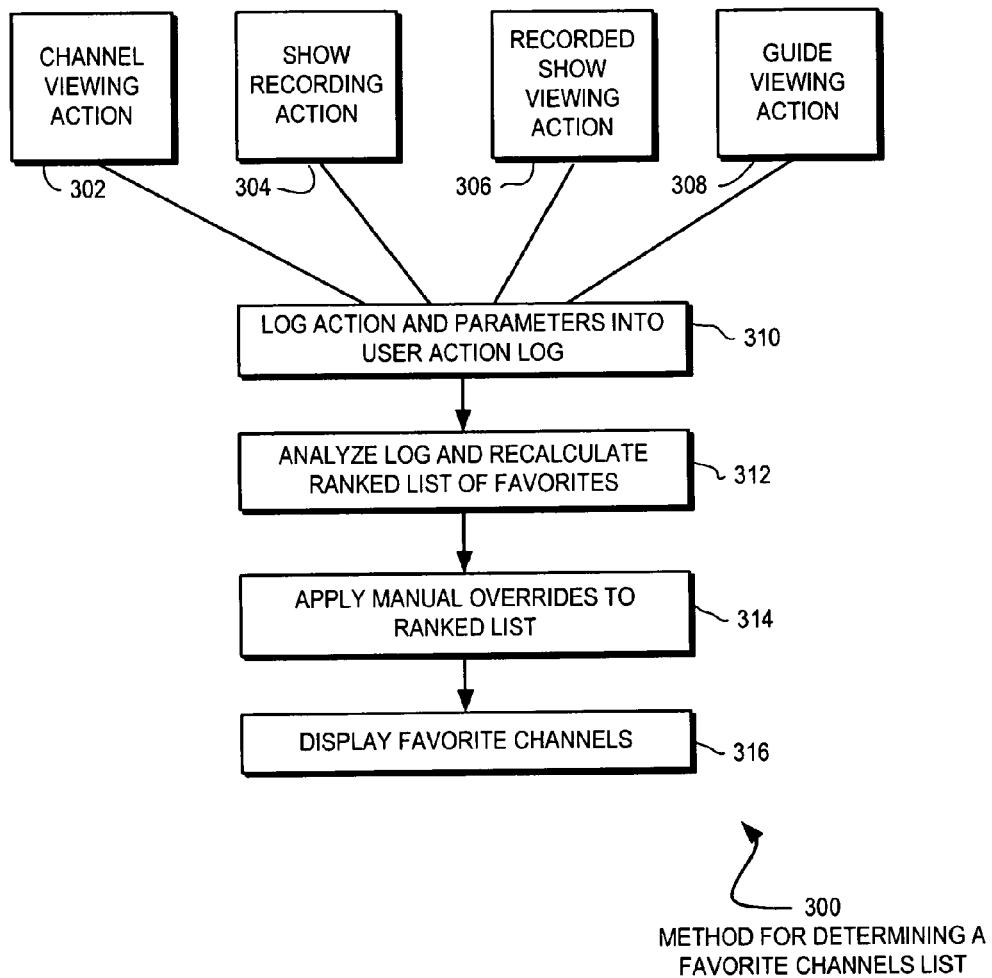
FIG. 3 is a flowchart illustration of an embodiment showing a method for determining a favorite channels list.

FIG. 3 is a flowchart illustration of an embodiment 300 showing a method for determining a favorite channels list. Various user actions, including channel viewing action 302, show recording action 304, recorded show viewing action 306, and guide viewing action 308 are logged into a user action log in block 310. The log may be analyzed and a list of favorites calculated in block 312. Manual overrides to the list may be applied in block 314 and the list displayed in block 316.

The channel viewing actions 302 may include any action relating to viewing live programming. Such actions may include the methods of channel selection such as direct channel entry, channel surfing, length of time viewing a channel, or other factors relating to user interactions with live programming.

Show recording actions 304 may relate to various actions a user takes to indicate which programs are to be recorded, the priorities for recording, various parameters a user may set for particular recordings, or other actions relating to selecting programming for recording.

Recorded show viewing actions 306 may include a user's behavior with programs that are previously recorded. In many cases, the user's actions with recorded programming may be one of the strongest indicators of preference for a particular channel. Those programs that are recorded indicate that the user must have performed some preliminary identification of the programming or type of programming. Then the user may take the additional step of actually viewing the programming. These actions in concert with each other may indicate that the user is very interested in the content, much more so than merely channel surfing from one channel to another and viewing a channel for a few short minutes. Recorded show viewing actions 306 may include how much of a program, if any, was viewed by a user, the scheduling and consistency of viewing recorded programs, whether the programs are viewed multiple times, or any other factor relating to the actions a user may take when viewing recorded shows.

Actions that a user takes while viewing a program guide 308 may indicate preferences for particular channels. These actions may include the method used to view a specific channel's information, the information requested, the length of time a user lingers on the information, or other factors that may indicate a user's channel preference.

The various actions are logged in a user action log in block 310. In some cases, the details of every action may be recorded and stored. In other cases, each action from the various types of user actions may be distilled into a weighting factor for various channels. In such a case, each channel may have a weighting factor assigned to a channel as a result of a user action. The process of logging the user actions may comprise incrementing a channel's weighting factor by the amount of each action.

The analysis and ranking of favorite channels in block 312 may comprise any calculations and computations necessary to determine a raw list of favorite channels. In some embodiments, computations may include applying weighting factors and rules to various parameters. In other embodiments, computations may include ranking or sorting the list of channels.

Manual overrides in block 314 may comprise predefined channels that a user may select to be always included or excluded from the list of favorites. In some instances, a user may request certain channels to always be included or excluded, regardless if the channel is ranked high on the favorites list. Such channels may be removed or added in block 314.

In block 316, the favorite channels may be used in any manner and in any form. In some cases, the favorite channels may be ranked from highest to lowest and used as a guide to browse live or future programming. In other cases, the favorite channels list may be the top 10 favorite channels but arranged by channel number. Further uses may include using the favorite channels list to prioritize recorded programs or for other uses.

Figure 4:
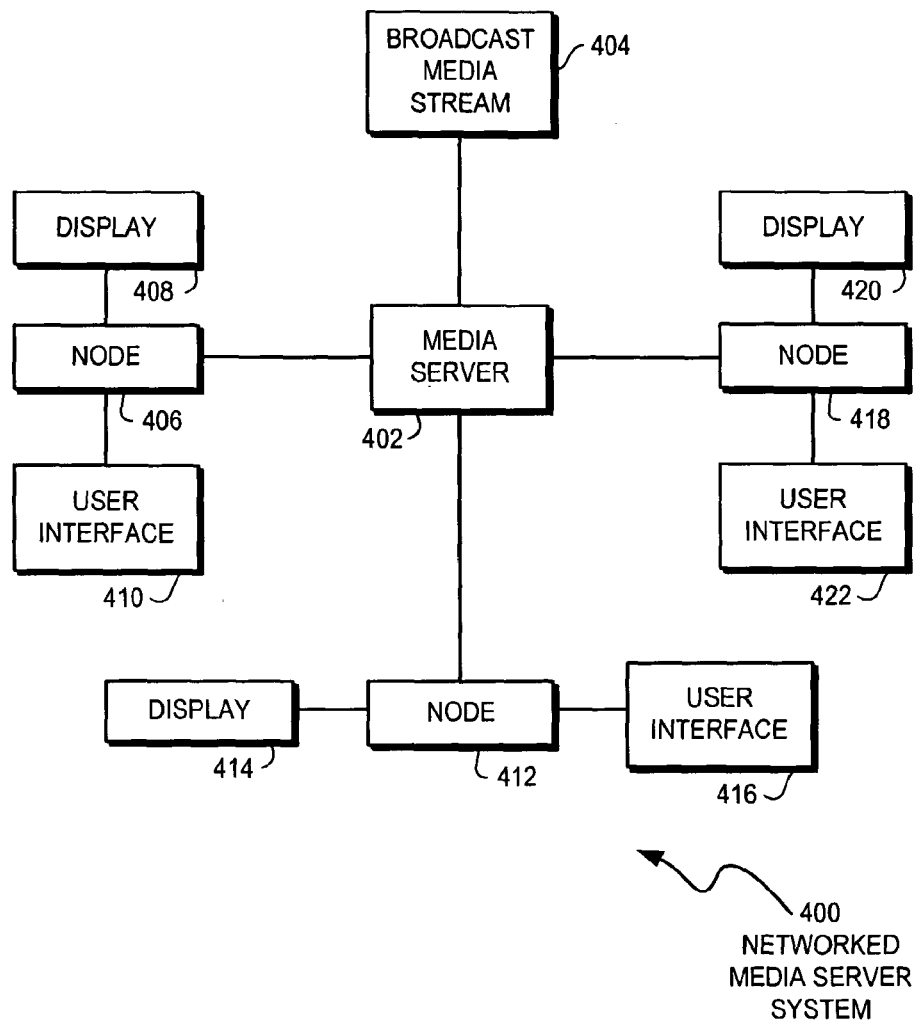
FIG. 4 is a diagrammatic illustration of an embodiment showing a networked media server system.

FIG. 4 is a diagrammatic illustration of an embodiment 400 of a networked media server system. The media server 402 receives a broadcast media stream 404 and is able to distribute the content to several different nodes 406, 412, or 418 via a network or other communications arrangement. The node 406 has a display 408 for viewing the content as well as a user interface 410. Similarly, nodes 412 and 418 have displays 414 and 420 as well as user interfaces 416 and 422, respectively.

The embodiment 400 illustrates a central media server 402 that may receive media content, store the content, and make the content available to the various nodes. The nodes 406, 412, and 418 may be various types of viewing devices, such as a television display and a set top box or a computer and monitor.

In some embodiments, the user actions used to generate a channel favorites list may be separately developed for each separate node 406, 412, and 418. Such an embodiment may be useful when a particular node may be associated with a specific user. For example, if a node were installed in the master bedroom of a residence, the channel favorites may be different than a node installed in a child's bedroom or a family room. Such embodiments may create separate channel favorites list for each node in addition to or instead of creating separate lists for individual users.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
    collecting channel viewing data, by a controller, from a first user's selection of channels, each of said channels defining a group of video media;
    for each of said channels selected by said first user, determining a mechanism used to select said channels, determining a weighting for said mechanism, and determining a viewing time for said channel, by the controller;
    for each of said channels selected by said first user, calculating a ranking by multiplying said weighting by said viewing time, by the controller; and
    updating a favorite channels list by the controller, said favorite channels list comprising a ranked list of channels, said updating comprising adding said channels selected by said first user to said favorite channels list using said ranking.

2. The method of claim 1, one of said mechanisms used to select channels being entry of a channel number.

3. The method of claim 2, one of said mechanisms used to select channels being pausing during a channel surfing session.

4. The method of claim 3, said entry of a channel number being weighted higher than said pausing during a channel surfing session.

5. The method of claim 1, said viewing time being discounted over a predefined length of time.

6. The method of claim 1, said favorite channels list changing based on the time of day.

7. The method of claim 1, said favorite channels list changing based on day of week.

8. A method comprising:
    collecting channel viewing guide data, by a controller, from a first user's operation of a viewing guide of channels, each of said channels defining a group of video media;
    for each of said channels viewed by said first user, determining a mechanism used to view said channels within said guide, determining a weighting for said mechanism, and determining a viewing time for said channel, by the controller; and
    for each of said channels selected by said first user, calculating a ranking by multiplying said weighting by a factor representing said viewing time, by the controller.

9. The method of claim 8 further comprising:
    updating a favorite channels list, said favorite channels list comprising a ranked list of channels, said updating comprising adding said channels selected by said first user to said favorite channels list using said ranking.

10. The method of claim 9, one of said mechanisms used to view said channels being viewing a program list for a channel.

11. The method of claim 10, one of said mechanisms used to view said channels being pausing over a channel and viewing a current showing.

12. The method of claim 11, said viewing a program list being weighted higher than said pausing over a channel.

13. The method of claim 8, said factor being a multiplication factor determined by a range of interaction times.

14. The method of claim 13, said factor having low values for very short interaction times.

15. The method of claim 14, said factor having low values for very long interaction times.

16. The method of claim 15, said factor having high values for interaction times between 5 and 10 seconds.

17. The method of claim 13, said range of interaction times being adapted to said first user's operation of said viewing guide.

* * * * *